July 23, 1968　　　　R. P. ZUNDEL　　　　3,393,586
CONTROL VALVE SYSTEM FOR A POWER SHIFT TRANSMISSION
FOR AGRICULTURAL AND INDUSTRIAL TRACTORS
Filed Oct. 12, 1966　　　　　　　　　　　　8 Sheets-Sheet 1
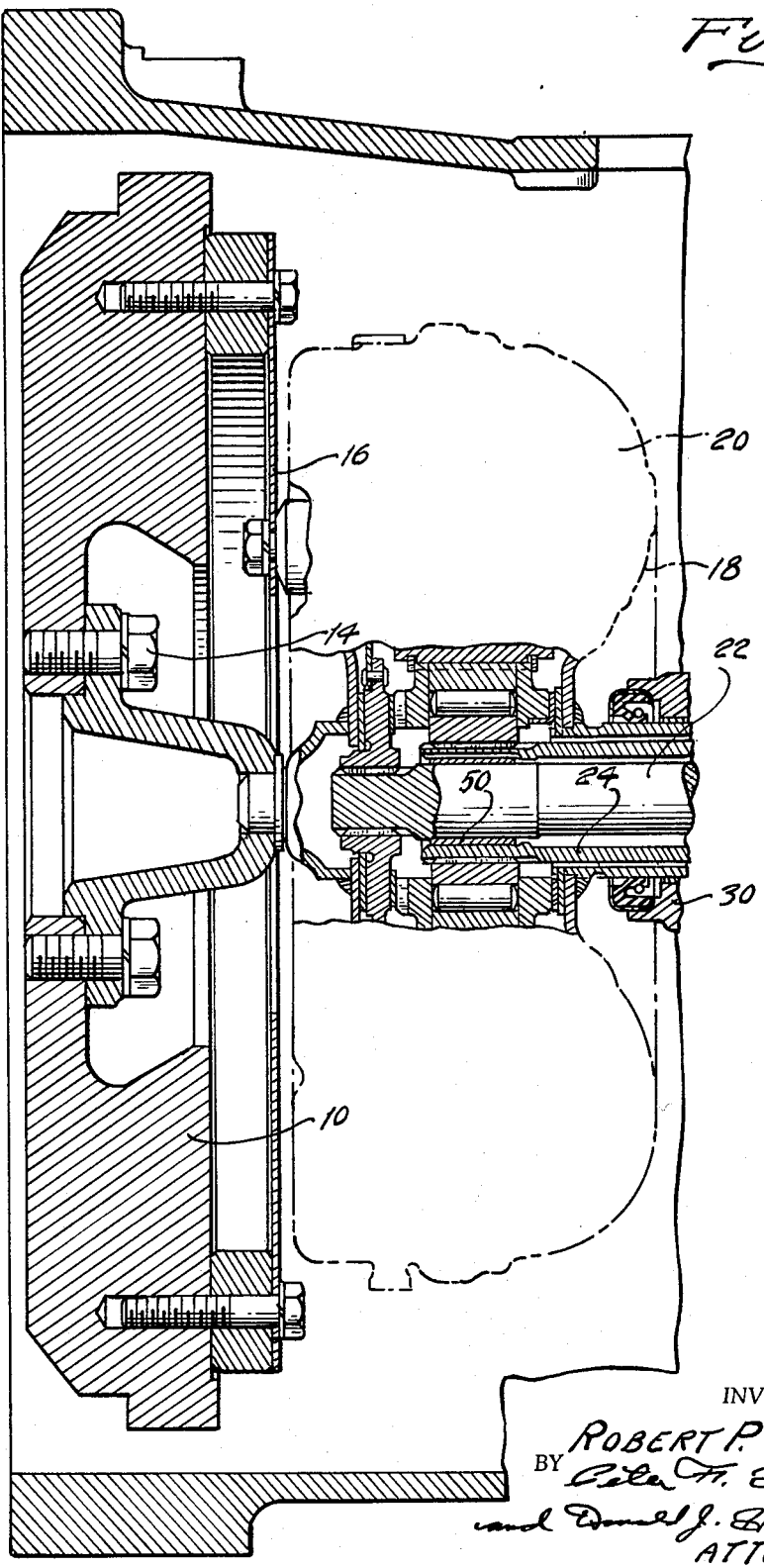
Fig. 1-A
INVENTOR:
ROBERT P. ZUNDEL
BY
ATTORNEYS.

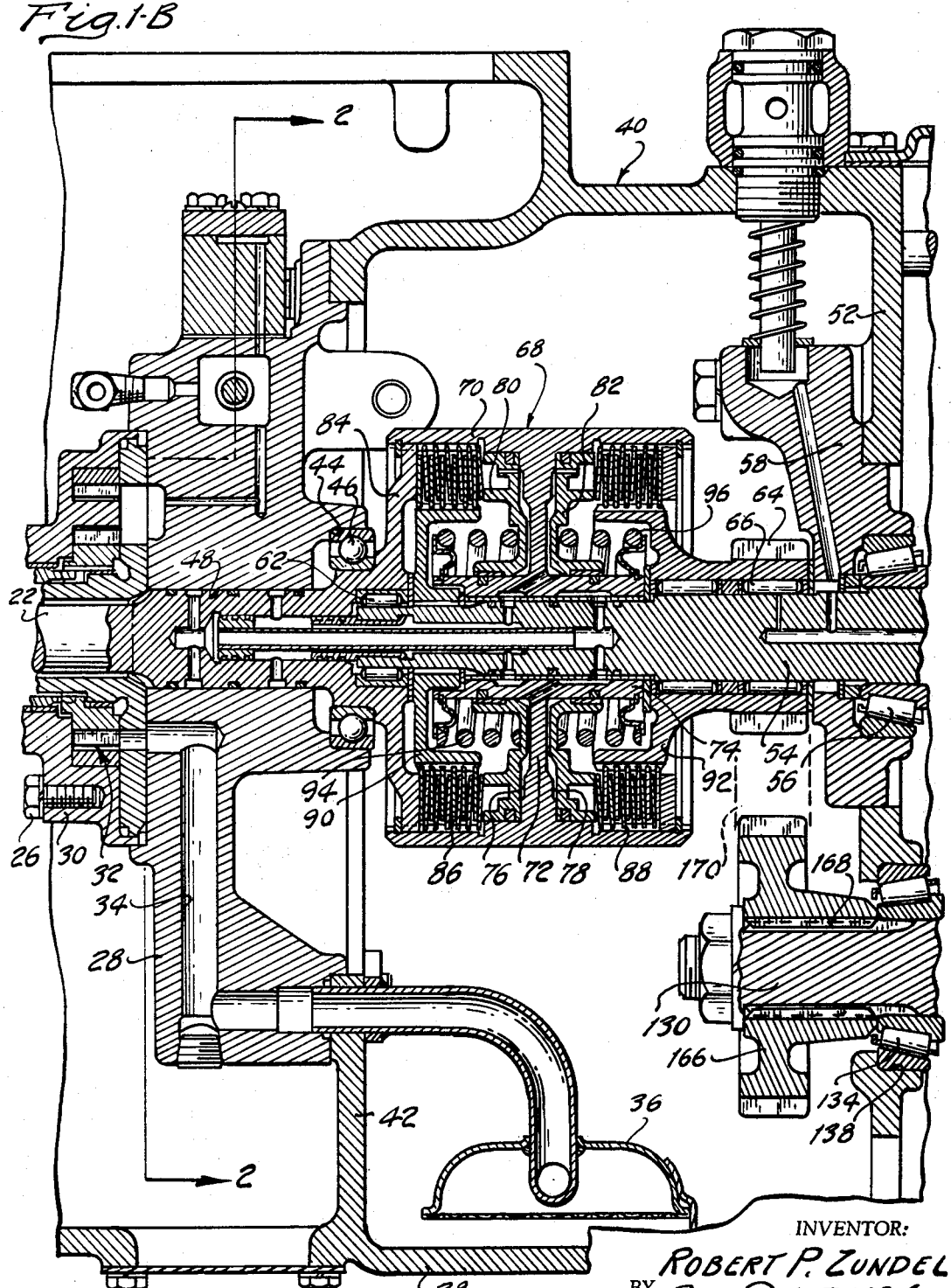

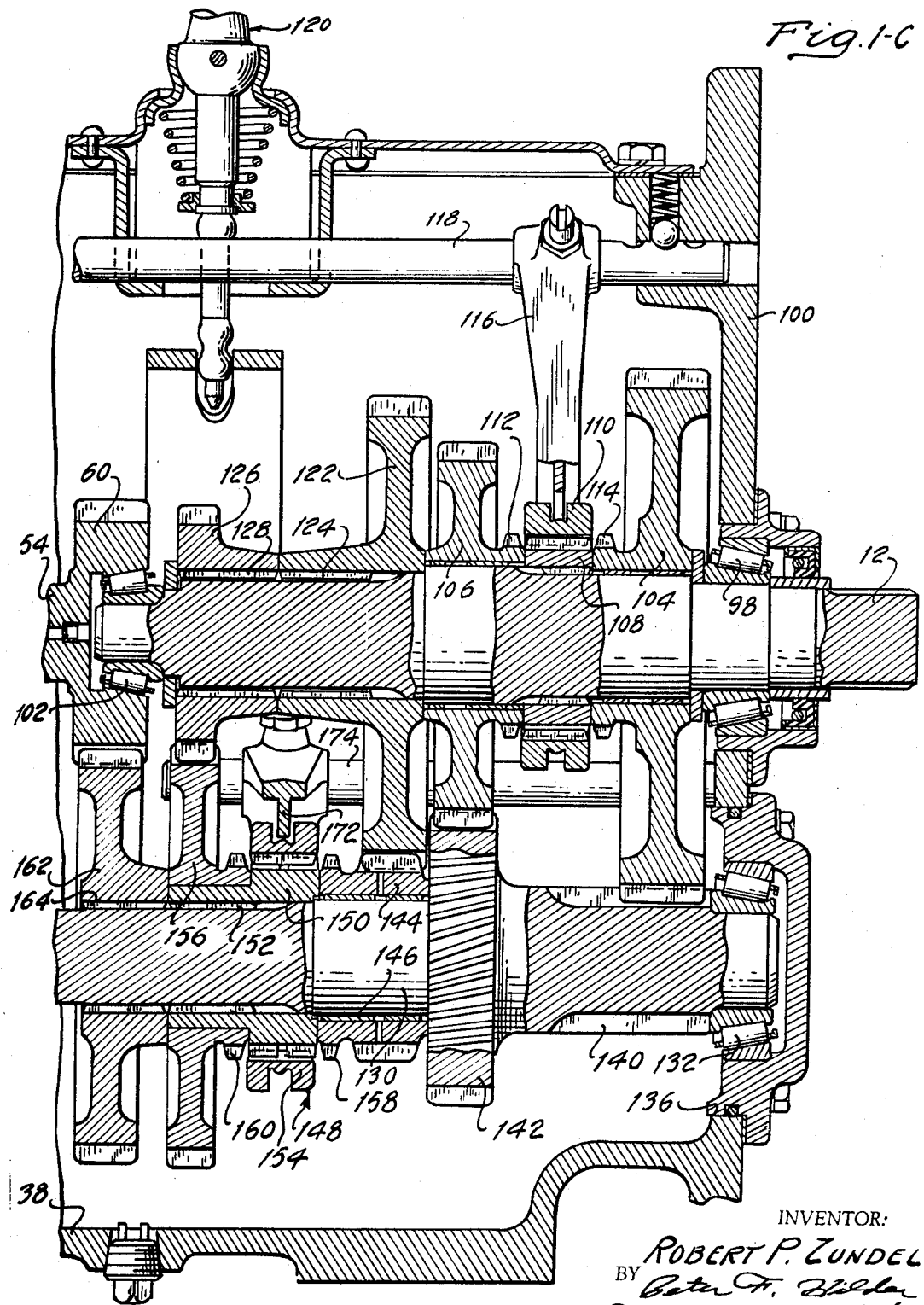

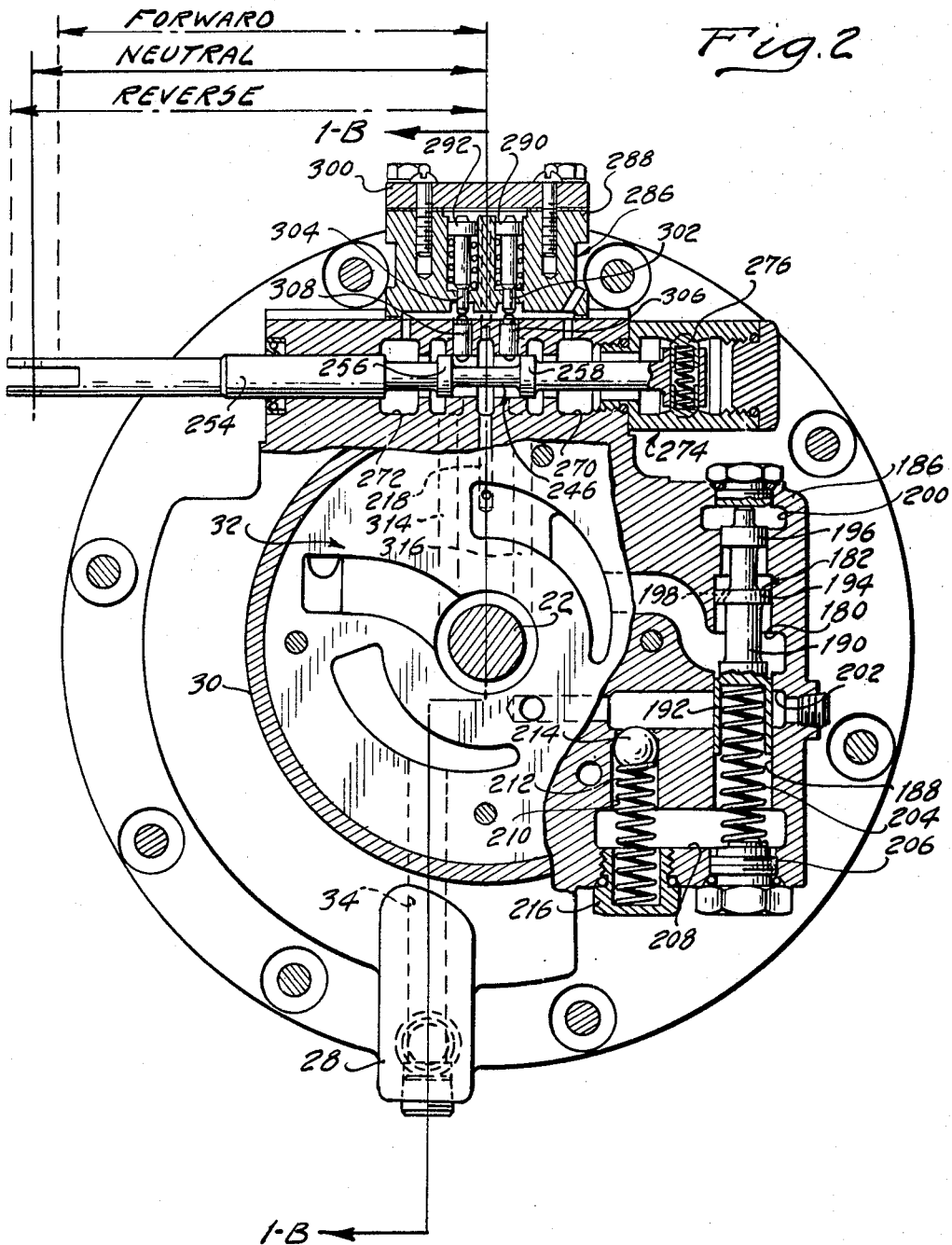

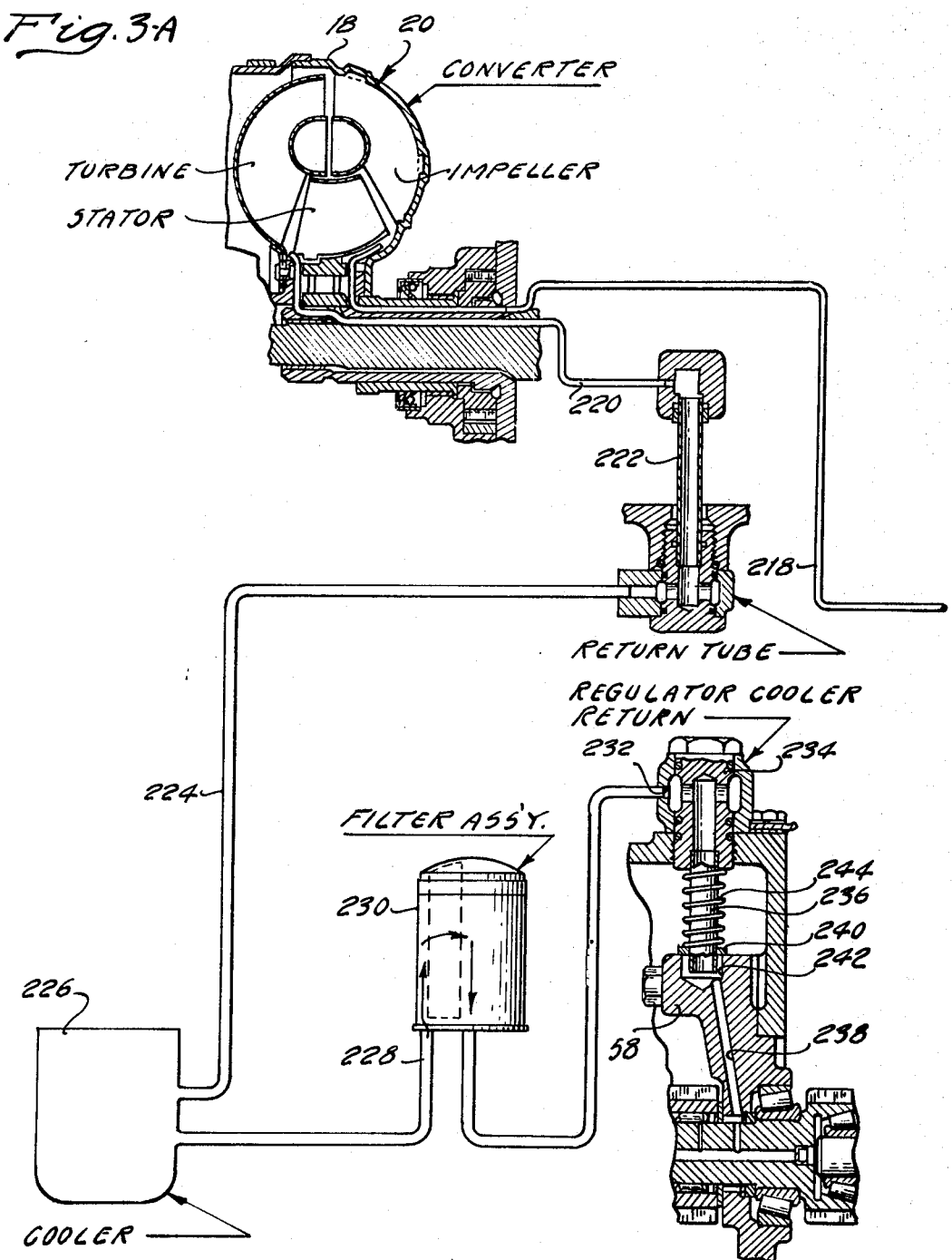

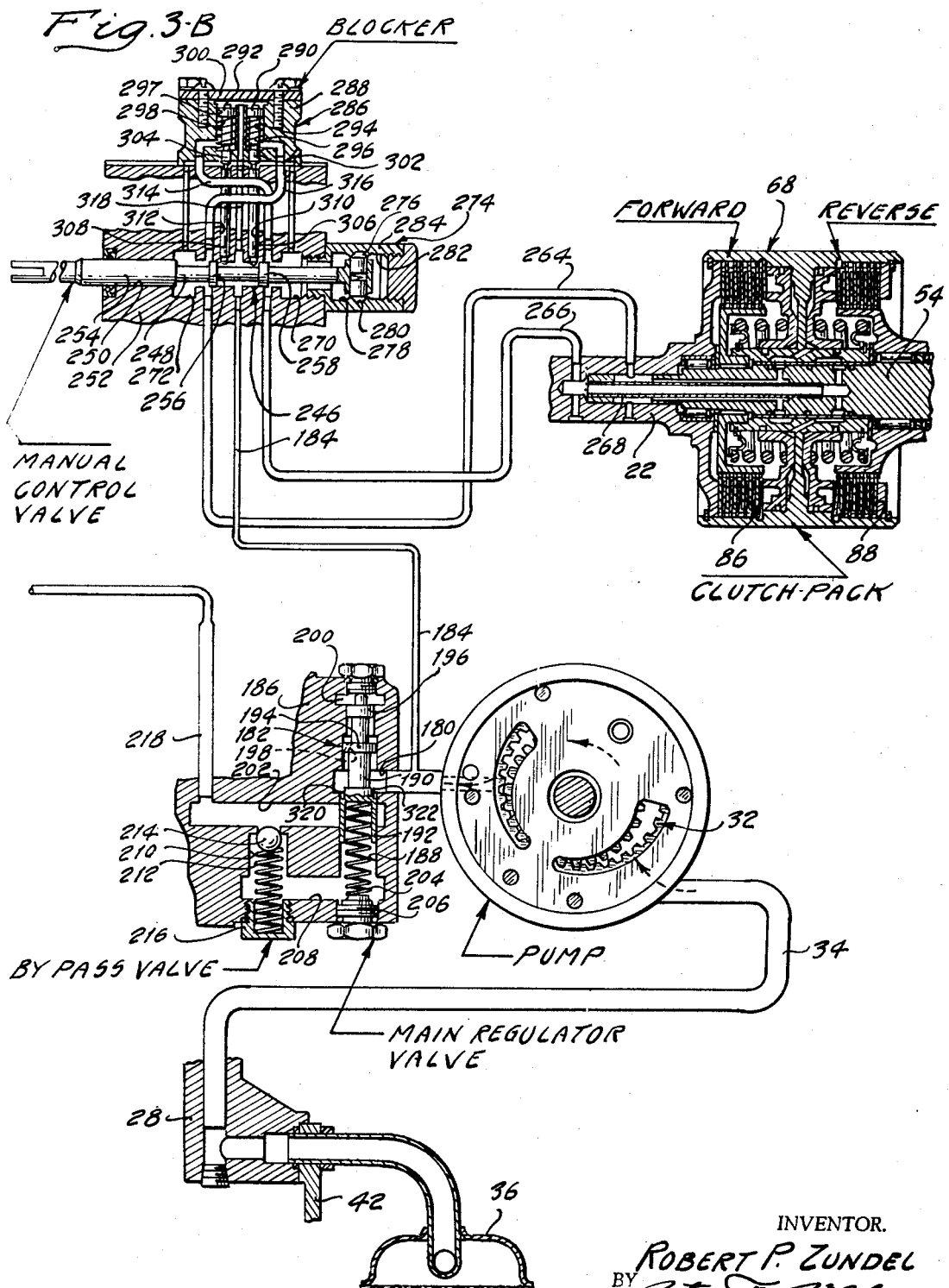

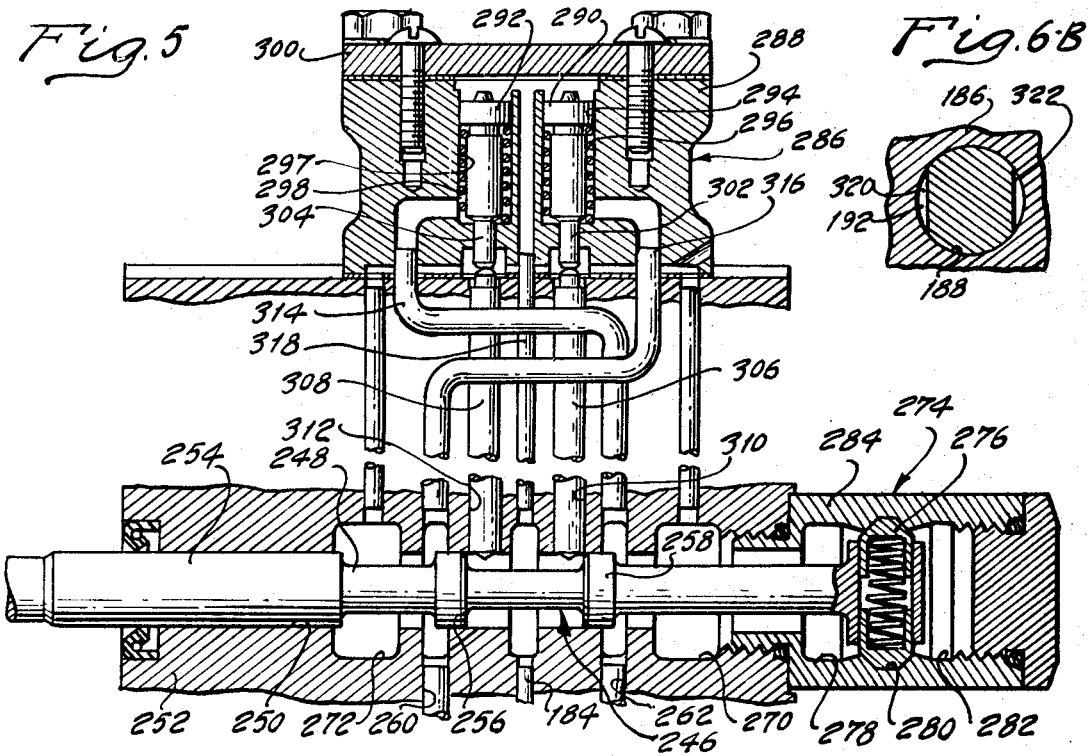
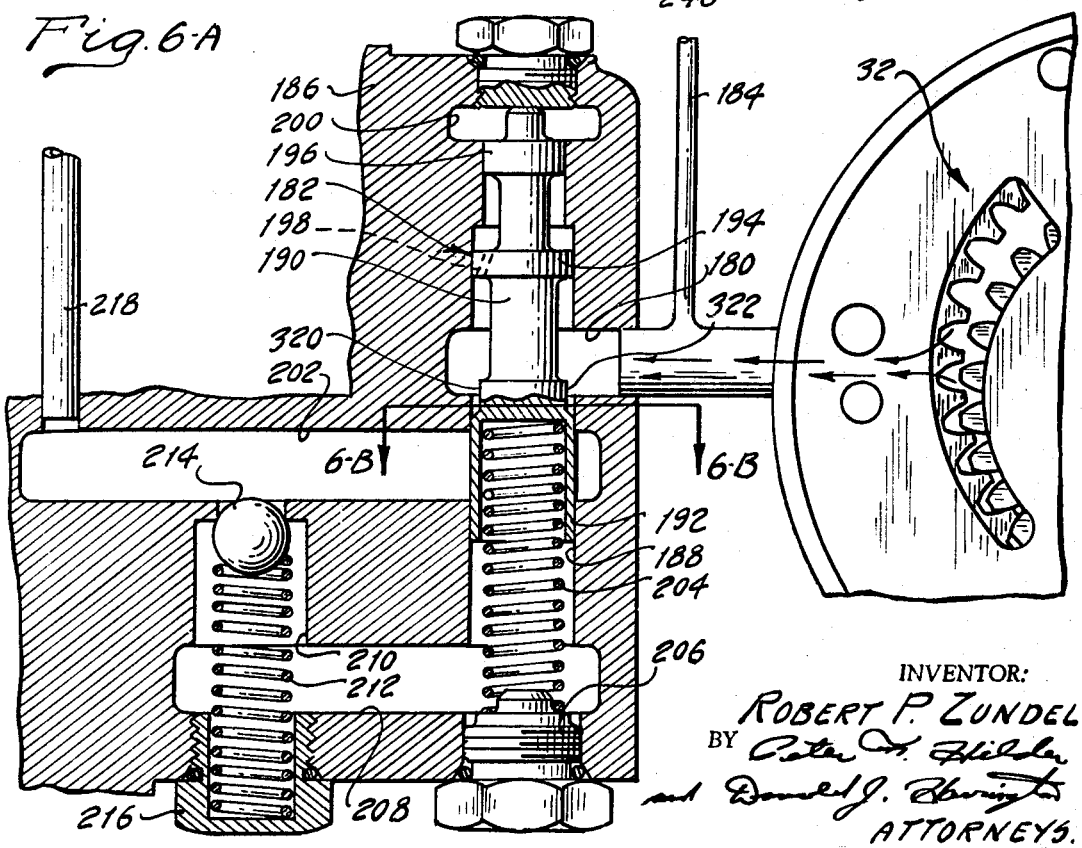

United States Patent Office 3,393,586
Patented July 23, 1968

3,393,586
CONTROL VALVE SYSTEM FOR A POWER SHIFT TRANSMISSION FOR AGRICULTURAL AND INDUSTRIAL TRACTORS
Robert P. Zundel, Birmingham, Mich., assignor to Ford Motor Company, Dearborn, Mich., a corporation of Delaware
Filed Oct. 12, 1966, Ser. No. 586,197
9 Claims. (Cl. 74—878)

My invention relates generally to drivelines for off-the-road tractor vehicles, and more particularly to improvements in a driveline for a tractor vehicle that includes a material handling implement, such as a loader. Although my disclosure is directed to an industrial tractor with a loader mounted on the front end of the tractor chassis, the improvement of my invention can be applied also to drivelines for agricultural and industrial tractors having other forms of implements such as graders, scrapers and backhoe units.

The industrial tractor driveline of this disclosure includes multiple ratio gearing which forms plural torque delivery paths between the tractor engine and the traction wheels. It is capable of providing four forward-driving speed ratios and four reverse-driving speed ratios, and it includes semi-automatic controls for selecting the forward drive range and the reverse drive range by appropriately engaging and releasing companion forward and reverse friction clutches. The vehicle operator thus can condition the gearing for operation in any one of the four forward or reverse driving ratios as the vehicle engine is operated at a pre-selected, constant speed.

In a preferred form of my invention, the engine of the tractor driveline is operated at a speed of approximately 1150 r.p.m. The operator can advance the loader into the load, and then back-off the tractor after the loader is filled. This is done simply by controlling the actuation and release of forward and reverse clutches in the driveline. A neutral condition is achieved by disengaging simultaneously both of the clutches. A hydrokinetic converter is situated between the engine and the clutches to cushion the driveline and to multiply engine torque.

Provision is made in my improved control system for preventing engagement of either the forward clutch or the reverse clutch when the engine speed exceeds a desired value, such as 1150 r.p.m. This avoids excessive loading of the driveline due to inertia forces, and it prevents the tractor vehicle from rising at its front end when the operator, during a reversal in the forward motion of the vehicle, shifts the controls to cause disengagement of the reverse drive clutch and attempts to engage the forward drive clutch.

The control system of my invention includes a manual selector valve which functions to distribute control pressure from an engine-driven pump, which acts as the pressure source, and fluid pressure-operated servos for the forward and reverse clutches. A hydromechanical interlock is used to inhibit the motion of the manual valve through a neutral position as the operator adjusts the valve from one of the operating drive range positions to the neutral position and then attempts to shift to the other drive range position.

The hydromechanical interlock establishes this inhibiting action only in response to an increased speed beyond the desired engine speed.

The operating pressure level made available to the clutches is controlled by a regulator valve, which may be calibrated to establish an operating pressure at the rated engine speed, which is sufficient to maintain the clutches fully engaged at peak loads.

The provision of the control system having these characteristics being an object of my invention, it is a further object of my invention to provide a control system for a transmission of the type above set forth wherein the operator may return the manual valve to a neutral position to release both clutches when the governed engine speed exceeds a desired value, but which prevents shifting movement thereafter from a neutral position to either of the two drive range positions.

It is a further object of my invention to provide a control system of the type above set forth wherein a regulating valve used for maintaining a desired regulated clutch pressure is capable of providing also a speed signal, which will be used by the hydromechanical interlock, to establish the previously described inhibiting action in response to an increase in engine speed beyond a calibrated value.

Further features of my invention will becom apparent from the following description and from the accompanying drawings, wherein:

FIGURES 1A, 1B and 1C show in longitudinal cross-sectional form a four-speed reversing transmission for use with an industrial tractor of the type previously described;

FIGURE 2 is a transverse cross-sectional view taken along the plane of section line 2—2 of FIGURE 1B;

FIGURES 3A and 3B show in schematic form a valve system for controlling the application and release of the forward and reverse clutches for the structure of FIGURES 1A, 1B and 1C;

FIGURE 5 is an enlargement of a portion of the drawing of FIGURE 3B;

FIGURE 6A is an enlargement of the view of the regulator valve assembly of FIGURE 3B; and, FIGURE 6B is a cross-sectional view taken along section line 6B—6B of FIGURE 6A.

Figure 4:
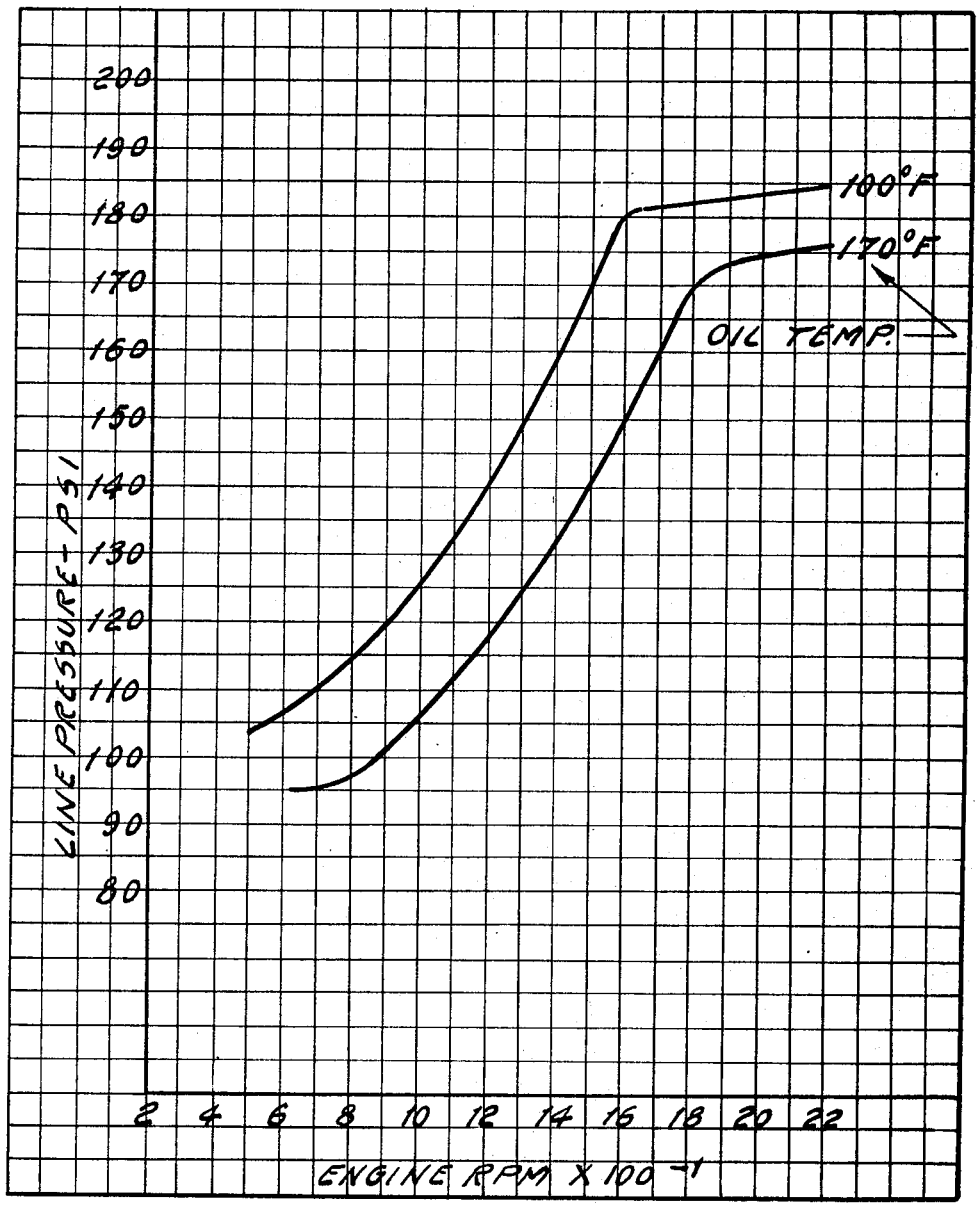
FIGURE 4 shows in graphic form the relationship between engine speed and the line pressure made available to the hydromechanical interlock valves.

In FIGURE 1A the flywheel for a tractor engine crankshaft is identified by reference character 10. The power output shaft for the transmission mechanism is as shown in FIGURE 1C at 12. Shaft 12 is connected by means of a drive shaft and a differential and axle assembly to the traction wheels of the vehicle. Flywheel 10 is bolted to the engine crankshaft by bolts 14 and is connected by means of a drive plate 16 to the impeller shell 18 of a hydrokinetic torque converter generally indicated by reference character 20.

The converter 20, which may be of conventional design, includes a turbine connected to a turbine shaft 22, and an impeller formed as part of an impeller assembly, including the shell 18. A bladed stator, situated between the flow outlet section of the turbine and the flow inlet section of the impeller, is mounted for one-way motion on a stationary stator sleeve shaft 24, which is bolted by means of bolts 26 to forward wall 28. Secured to the wall 28 also is a pump housing 30, which contains positive displacement pump elements 32. These elements 32 form a pressure source for the control system to be described with reference to FIGURES 3A and 3B. The pump elements 32 are supplied with fluid through a low pressure fluid supply passage 34 formed in the wall 28. This passage 34 communicates with an oil filter screen assembly 36 situated in the transmission sump 38. The sump 38 is defined by the lower region of a transmission casing or housing 40.

Wall 28 is secured at its margin to internal shoulder 42, which forms a part of the casing for housing 40. Housing 28 provides also a bearing recess 44 which receives bearing 46. Shaft 22 is journaled rotatably in the central opening 48 by means of the bearing 46. It is journaled also within the stator sleeve shaft 24 by a bushing 50.

An intermediate bearing support wall 52, which forms a part of the casing 40, extends radially inwardly. A clutch output shaft 54 is journaled by means of a bearing 56 within a bearing support 58, the latter being secured to the wall 52. Power input gear 60 is connected directly to the shaft 54. The other end of the shaft 54 is journaled by bearing 62 within a bearing recess formed on the right-hand end of shaft 22.

A second power input gear 64 is journaled by means of a bearing 66 on the shaft 54. Gear 64 is located within the portion of the housing interior situated between the wall 28 and the wall 52 that is occupied also by a multiple disc clutch assembly 68.

Assembly 68 includes a clutch drum 70 supported by a central web 72. The web is formed with a hub 74 which is journaled by bushings on shaft 54. The drum 70, the web 72 and the hub 74 define a pair of opposed annular cylinders 76 and 78 which receive, respectively, annular pistons 80 and 82. Drum 70 is connected directly to and is partially supported by a flange 84 formed on the shaft 22.

The clutch assembly 68 includes a multiple disc forward drive clutch assembly 86 and a multiple disc reverse drive clutch assembly 88. Clutch 86 includes friction discs carried by the drum 70 and cooperating friction discs carried by clutch element 90, which in turn is splined to shaft 54. Clutch 88 includes friction discs carried by drum 70 and cooperating friction discs carried by clutch element 92, the latter forming an integral part of the power input gear 64 which is active during reverse drive operation, as will be explained subsequently.

Piston 80 and cylinder 76 define a pressure chamber that can be supplied with suitable internal passages formed in the shaft 54. The pressure chamber defined by piston 82 and cylinder 78 similarly can be supplied with fluid. When cylinder 76 is pressurized, the piston 80 energizes the clutch discs 86, thereby establishing a direct connection between shaft 22 and the shaft 54. As fluid pressure is transmitted to the cylinder 78, discs 88 establish a driving connection between the shaft 22 and gear 64. When the clutch pressure is relieved from the clutch cylinders 76 and 78, the cooperating pistons 80 and 82 are urged to a clutch release position by their return springs 94 and 96, respectively.

Power output shaft 12 is journaled by bearing 98 within an end wall 100, which forms a part of casing 40. The left-hand end of shaft 12 is journaled by bearing 102, then a bearing recess formed in gear 60. Journaled rotatably on an intermediate section of the shaft 12 is a first ratio output gear 104. A third speed ratio power output gear 106 is journaled on the same shaft section as gear 104. Each gear 106 and 104 can be connected selectively to the shaft 12 by means of a dog clutch which comprises a hub 108 on which an internally splined clutch sleeve 110 is positioned. Sleeve 110 can shift axially on hub 108, but relative rotation therebetween is prevented by the splines. When sleeve 110 is shifted in a left-hand direction its teeth engage clutch teeth 112 carried by gear 106, thereby locking gear 106 to the shaft 12. When sleeve 110 is shifted in a right-hand direction, its internal teeth engage clutch teeth 114 thereby locking gear 104 to the shaft 12. Shifting movement of the sleeve 110 is accomplished by a shifter fork 116 secured to a shift rail 118. This rail is mounted within the casing 40 in a direction parallel to the axis of shaft 12. The shifting can be accomplished manually by an appropriate driver-controlled shift lever assembly 120.

A second speed ratio power output gear 122 is splined directly to the shaft 12 and 124. A fourth speed ratio over-driver gear 126 also is splined directly to the shaft 12 as shown at 128.

Mounted in parallel disposition with respect to the shaft 12 is a countershaft 130 which is end-supported by the casing 40 by a first bearing 132 in a second bearing 134. Bearing 132 is received within a bearing retainer which in turn is positioned in bearing opening 136 formed in end wall 100. Bearing 134, on the other hand, is received within bearing opening 138 formed in intermediate wall 52. The right-hand end of countershaft 130 carries an integrally formed low speed ratio gear element 140, which engages continuously the power output gear 104. Another gear element 142 is formed integrally on the shaft 130. It engages continuously third speed ratio gear 106.

A second speed ratio gear element 144 is journaled by a bushing 146 on the shaft 130. It engages continuously the second speed ratio gear 122. The second dog clutch assembly 148 is mounted on the countershaft 130. It includes a hub 150 which is splined at 152 to the countershaft and which is formed with external splines. These engage internal splines formed on clutch sleeve 154. A fourth speed ratio gear element 154 is journaled rotatably on the hub 50. It engages fourth speed ratio gear 126.

Gear 156 and gear 144 can be connected directly to hub 150 by appropriately shifting in one direction or the other the clutch sleeve 154. When it is shifted in a right-hand direction, sleeve 154 engages clutch teeth 158, thereby establishing a direct connection between shaft 130 and the gear 144. When sleeve 154 is shifted in a left-hand direction, the internal clutch teeth of the sleeve 154 engage drivably clutch teeth 160 of the gear 156.

Another gear element 162 is splined at 164 to the shaft 130. Gear element 162 engages gear 60. Shaft 130 carries also a reverse drive gear element 166 which is splined at 168 to the shaft 130. Gear element 166 is adapted to engage drivably a reverse drive pinion 170, which in turn meshes with power input gear 164.

Shifting movement of the sleeve 154 is accomplished by a shifter fork 172 carried by a shift rail 174. Rail 174 is actuated by the shift lever 120 by the vehicle operator. The necessary mechanical connection between rail 174 and the lever 120 is only partially shown in the drawing.

To condition the mechanism for operation in the forward drive range, it merely is necessary to engage clutch 86 and to disengage clutch 88. Turbine torque from the converter 20 then is delivered directly from turbine shaft 22 to the forward drive power input gear 60. If at this time the fourth speed ratio gear 104 is connected to the shaft 12, driving power will be delivered from shaft 22, through clutch 86, through gear 60, through gear element 162, through shaft 130, through gear element 140 and through gear 104 to the shaft 12. If gear 104 is released and gear element 144 is connected to countershaft 130, the transmission will operate in the second speed ratio when clutch 86 is applied. Torque then is delivered from gear 60 to gear element 162, to gear element 144 and then through gear 122 to the power output shaft 12.

If the sleeve 154 is shifted to the neutral position shown in FIGURE 1B and the clutch sleeve 110 is shifted in a left-hand direction, the transmission will operate in the third speed ratio as clutch 86 becomes applied. Torque then is delivered from gear 60 to gear element 162, to gear element 142 and through gear 106 to the shaft 12.

If the sleeve 110 is shifted to the neutral position shown in FIGURE 1B and the sleeve 154 is shifted in a left-hand direction, the transmission will be conditioned for fourth speed ratio operation as clutch 86 becomes applied. Turbine torque then is delivered from gear 60 to gear element 162, to gear element 156 and through gear 126 to the power output shaft 12.

A full range of reverse drive speed ratios is achieved in the same manner described with reference to the forward drive operating range except that the clutch 88 is applied and released instead of the clutch 86. In this instance gear element 166 serves as a power input gear element for the cluster gear assembly. Turbine torque is delivered from shaft 22 through the clutch 86, through power input gear 64, through the reverse idler 170 and through the gear element 166 to the countershaft 130. After the vehicle is conditioned for operation at a particular ratio, forward and reverse operation are achieved by appropriately engaging and releasing the clutches 86 and 88.

The control valve circuit for controlling the operation of the clutches is shown in FIGURES 3A and 3B. The discharge side of pump 32, as seen in FIGURE 3B, communicates with fluid supply port 180 of the main regulator valve assembly 182 in FIGURES 3B and 6A. The discharge side of the pump 32 and port 180 communicates also with a blocker valve supply passage 184 for the hydromechanical interlock assembly, which I will describe subsequently.

Regulator valve assembly 182 includes a valve body 186 within which is formed a regulator valve chamber 188. A multiple land valve spool 190 is situated in the chamber 188. It includes spaced valve lands 192, 194 and 196. These register, respectively, with cooperating internal valve lands formed in the valve chamber 188. The portion of the valve element 190 between lands 192 and 194 is of greater diameter than the portion of the valve element 190 between lands 194 and 196. Thus when the land 194 moves within the valve chamber 188, fluid will be displaced from one side of land 194 to the other through a placed from one side of land 194 to the other through a flow restricting orifice 198. This produces a stabilizing influence which prevents uncontrolled oscillation of the valve element 190 in its valve chamber 198. The upper region 200 of the chamber 188 functions as an exhaust port.

The regulated output pressure port for valve 182 is shown at 202. Communication between port 180 and port 202 is controlled by valve land 192. Valve element 190 is biased normally in an upward direction, as viewed in FIGURES 3B and 5, by valve spring 204. A threaded valve plug 206 in the lower end of the chamber 188 provides a seat for the spring 204.

An exhaust port 208 communicates with a portion of the chamber 188 as occupied by the spring 204. It communicates also with a bypass valve chamber 210 which receives a valve spring 212 and a bypass check valve 214. This valve seats against a valve opening which establishes controlled communication between port 208 and high pressure port 202. Spring 212 is seated on a valve plug 216. Valve element 214 establishes communication between port 202 and port 208 when the pressure in port 202 exceeds a safe value.

Port 202 communicates with the converter feed passage 218 which communicates with the torus cavity of the hydrokinetic torque converter 20. A flow return passage 220 also communicates with a converter torus circuit which delivers converter fluid through a return tube 222 to the valve body located in the base of the previously described transmission sump. Oil then flows from the return tube 222 through a cooler feed passage 224 to an oil cooler 226. The output of the oil cooler is transferred through a passage 228 to a filter assembly 230, and from there it is delivered to a lubrication oil port 232 formed at a location near adapter 234 carried by the casing 40. The lubrication oil then passes in a downward direction through a lube oil tube 236 to various lubrication passages in the transmission system, such as passage 238. A disc valve 240 registers with a valve port 242 formed in bearing adapter 58. As lubricating oil pressure is developed, the disc valve 240 will be unseated against the opposing influence of the disc valve spring 244 so that the lubricating fluid can be returned to the sump.

Regulator valve land 192 causes an increase in the pressure in port 180 as the pump 32 is driven. If the driven speed of the pump 32 is sufficiently high, the valve element 190 will be urged in a downward direction against the opposing force of spring 204. The pressure force that causes shifting movement of the valve element 190 is created by reason of the difference in the diameters of land 196 and land 192. The magnitude of the pressure in passage 180 at which the valve element 190 will begin to regulate depends upon the calibration of spring 204 as well as on the differential area produced by the lands 192 and 196.

Passage 184, which serves to supply the hydromechanical interlock, also is used to supply fluid to the manual control valve 246. This valve includes a multiple land valve element 248 slidably positioned within a valve chamber 250 formed in valve body 252. Valve element 248 includes spaced valve lands 254, 256 and 258. A first pressure delivery port 260 communicates with valve chamber 250 at a location adjacent land 256. A second pressure delivery port 262 communicates with chamber 250 at a location adjacent land 258. Port 260 communicates with the reverse drive servo through conduit 264 and port 262 communicates with the forward drive servo through a conduit 266. These conduits 264 and 266 are defined in part by coaxial openings formed in shafts 22 and 54 and by flow-distributing tubular insert 268. The passage through the center of insert 268 forms a part of passage 266. The annular passage surrounding insert 268 forms a part of passage 264.

The chamber 250 is vented at two spaced locations as shown at 270 and 272. Passage 184 communicates with the chamber 258 at a location intermediate the lands 256 and 258. Thus when the valve element 248 is shifted in a right-hand direction, passage 184 is brought into communication with passage 266 thereby causing regulated pressure in passage 184 to be transferred to the forward drive servo. At the same time the passage 264 extending to the reverse drive servo is brought into communication with the exhaust 272. When the operator shifts the valve element 248 in a left-hand direction, passage 184 is brought into communication with reverse servo feed passage 264 and forward drive servo feed passage 266 is brought into communication with exhaust 270.

The valve element 248 is shown in the neutral position in FIGURE 5 in which both of the passages 264 and 266 are exhausted. This neutral position is established by a spring detent mechanism 274. It includes spring loaded detent elements 276 carried by valve element 248. They are adapted for movement under spring pressure in a radially outward direction so that they engage selectively first, second and third detent positions 278, 280 and 282. These respectively correspond to the reverse drive position, the neutral position and the forward drive position. Each of these positions is established by annular grooves formed in the cylindrical detent housing 284 secured to one end of the valve body 252.

A blocker valve assembly 286, which performs an inhibiting action for the manual valve, comprises a valve body 288 and to blocker valve plungers 290 and 292. These are slidably situated within cooperating cylindrical chambers 294 and 296, respectively.

Plungers 290 and 292 normally are urged in an upward direction, as viewed in FIGURE 5, by valve springs 297 and 298, respectively. The upper ends of the chamber 294 and 296 are enclosed by a closure plate 300 secured to body 288. The plungers are adapted to engage pins 302 and 304 which are slidably situated in the valve body 288 in axial alignment with plungers 290 and 292, respectively. These pins are adapted to engage blocker pins 306 and 308 which are slidably situated in openings 310 and 312, respectively, formed in valve body 252. One end of interlock element 306 is situated directly adjacent land 258 of the valve element 248. One end of the other interlock element 308 is situated directly adjacent valve land 256. When interlock element 306 is urged in a downward direction, the valve element 248 is inhibited from shifting movement in a left-hand direction. If the valve element 248 is shifted to the reverse position, element 308 assumes an upward position so that return movement of the valve element cannot be inhibited. Thus it is possible for the valve element 248 to return from the reverse position to the neutral position without interference by the element 306. On the other hand, if the element 306 is urged downwardly, the operator cannot return the valve from the neutral position to the reverse position because of the interference between the element 306 and the land 258.

Interlock element 308 functions in a similar fashion to provide interference with land 256 to inhibit shifting movement of the element 248 in a right-hand direction to the forward drive position when element 308 is moved downwardly. Element 308 is not effective to inhibit movement of the element 248 from the forward drive position to the neutral position since it assumes an upward position when the element 248 assumes a forward drive position. It will inhibit, however, a shifting movement of the element 248 from the neutral position to the forward drive position when it is a downward position where interference can occur between it and the land 256.

The spring chamber occupied by a spring 298 communicates with the forward drive clutch servo feed passage 266 through a crossover passage 314. In a similar fashion reverse clutch servo forward passage 264 communicates with the spring chamber occupied by spring 296 through a crossover passage 360. Passage 184 communicates with the upper end of each of the chambers 297 and 294 through a branch passage 318. Thus the upper end of each of the plungers 290 and 292 is subjected to the pressure that exists in passage 184.

The regulator valve element 190 includes a pair of flats 320 and 322, as seen best in FIGURE 6B, which provide controlled communication between port 180 and port 202. These flats serve as an effective variable area orifice. As the speed of the pump 32 increases after a steady-state, regulated condition is achieved, a pressure build-up will occur in passage 184 that is generally functionally related to pump speed because of the orificing action of the flats 320 and 322. If the pump speed should increase to a value greater than the controlled speed range that is desired, a speed signal then will be delivered through passage 184 to the upper end of the valve plungers 290 and 292. If the spring chamber for any one of the plungers is exhausted, this increase in pressure in passage 184 will cause a shifting movement of the plunger in a downward direction, thereby inhibiting the shifting movement of the valve element 248 in one direction or the other. If the valve 248 is in a neutral position, both elements 308 and 306 will be caused to move to their inhibiting position.

If this speed increase occurs when the transmission is conditioned for reverse drive operation, passage 316 will be pressurized. This then means that plunger 290 will not be actuated in a downward direction since such downward motion is inhibited by the pressure in the spring chamber for spring 296. It then is possible for the operator to readily shift the manual valve from the reverse position to the neutral position. At that time passage 316 immediately becomes exhausted. The plunger 290 then will immediately respond to the exhausting pressure from the spring chamber for the spring 296 to cause the element 306 to assume the blocking position. This then will prevent the operator from shifting back to the reverse position. The other element 308 at that time already prevents shifting movement of the manual valve to the forward drive range position.

The converse of this action also is true. For example, if the forward drive servo is applied when the speed increases above the desired value occurs, the plunger 306 will immediately assume the inhibiting position since passage 316 at that time is exhausted. On the other hand, element 308 will assume the upward position since the passage 314 in the spring chamber 298 is pressurized to overrule the speed signal acting on the upper end of the plunger 292. This means, therefore, that the operator can move readily the manual valve from the forward position to the neutral position. As soon as that occurs, passage 314 becomes exhausted through port 270 as the forward drive servo becomes disengaged.

During operation the engine speed can be set initially by the operator by means of a hand throttle. This establishes a minimum speed at which the engine would operate. The action of the hand throttle can be overruled, however, by a foot throttle so that the operator can, if he so desires, increase the engine speed to meet any given operating requirement. In operating a loader the operator lowers the loader bucket as he approaches a pile of material to be loaded. This may be sand, stone, dirt, bricks or other heavy material. The operator may tilt the bucket to fill it with this material. He then may shift the manual valve to the reverse position to back away from the pile. At that time the vehicle operator would normally increase the engine speed somewhat. If that speed is greater than a safe value, the hydromechanical interlock shown in part at 286 will prevent the operator from shifting the manual valve from the reverse position directly to the forward drive position. This avoids an excessive loading of the driveline and it also prevents an unstable condition which might cause the front end of the vehicle to rise and dislodge part of the load in the bucket.

If an emergency condition exists, the operator can merely shift the manual valve to the neutral position regardless of whether the engine speed is higher than the limiting value or lower, and regardless of the direction of motion of the vehicle. At the time the shift is initiated, the hydromechanical blocker elements begin their inhibiting action only after the manual valve has assumed the neutral position. The manual valve cannot be moved from that position until the operator reduces the engine speed to a safe value.

If the engine speed that is set by the hand throttle is at the critical limiting speed or just below it, the operator should use the vehicle brakes rather than the transmission and driveline for braking of the vehicle as he maneuvers the vehicle from a reverse driving condition to a forward driving condition.

The foot throttle and foot brake operator can be arranged so that it is necessary for the operator to remove his foot from the throttle to apply the brakes. Manifestly this means, therefore, that the engine speed will become reduced to a stated value each time a foot brake is operated. But even if the operator should deviate from this suggested operating pattern, the hydromechanical interlock system of my invention will prevent an overstressing of the torque delivery elements of the driveline and instability of the vehicle.

In FIGURE 4 I have illustrated the relationship between engine speed and line pressure which is achieved by my improved regulator valve. The actaul value, of course, depends upon the temperature of the oil. The pressure can vary from the upper curve of FIGURE 5 to the lower curve of FIGURE 5 as the temperature changes from 100° F. to 170° F. At the regulated engine speed, which may be 1150 engine r.p.m., the curve that is found on FIGURE 5 has a relatively steep slope. This then means that as engine speed varies, the resulting variation in line pressure will provide an adequate speed signal for operating the hydromechanical interlock.

Having thus described a preferred form of my invention, what I claim and desire to secure by U.S. Letters Patent is:

1. In a torque delivery driveline for a vehicle adapted to deliver driving torque from an engine to a vehicle traction member, a driving shaft, a driven shaft, multiple speed ratio gearing comprising relatively movable gear elements defining plural torque delivery paths between said driving shaft and said driven shaft, a pair of power input gear elements, a forward-drive fluid pressure operated friction clutch between said driving shaft and a first one of said power input gear elements to define in part a forward power flow path through said gearing, a fluid pressure operated reverse clutch between said driving shaft and a second power input element of said gearing, a fluid pressure source, a conduit structure interconnecting said pressure source and each of said clutches including separate branch portions extending to each clutch, a manual control valve means situated in and partly defining said conduit structure for selectively distributing pressure from said pressure source to each of said branch portions while exhausting the other branch portion, a hydromechanical interlock having at least one pessure-operated interlock plunger, an interlock element movable transversely with respect to the path of movement of said control valve means, said interlock element inhibiting motion of said control valve means when it assumes one position and movable out of registry with said control valve means when it assumes another position, a mechanical connection between said plunger and said interlock element for operating the latter, a source of pressure signal that is proportional in magnitude to the driving speed of said driving member, and a hydraulic connection between said signal source and said plunger for actuating the latter to a position wherein motion of said control valve means is inhibited when the pressure signal exceeds a predetermined value.

2. The combination as set forth in claim 1 wherein said hydromechanical interlock includes two plungers and two motion inhibiting interlock elements, each plunger being mechanically connected to a separate one of said interlock elements, each interlock element being movable into the path of motion of said manual control valve means when said speed signal exceeds said predetermined value, said speed signal acting upon and triggering the operation of each plunger, one plunger inhibiting motion of said manual control valve means in one direction to the reverse drive position and the other element inhibiting the motion of said manual control means in the opposite direction to the forward drive position.

3. The combination as set forth in claim 2 wherein said interlock includes branch passages extending from said manual control valve means to each of said plungers whereby the latter are subjected to an overruling pressure force that opposes the force of said speed signal, said manual control valve means including valve lands establishing communication between said pressure source and one plunger when it assumes one driving position and establishing communication with the other plunger when it assumes the other driving position.

4. In a torque delivery driveline for a vehicle adapted to deliver driving torque from an engine to a vehicle traction member, a driving shaft, a driven shaft, multiple speed ratio gearing comprising relatively movable gear elements defining plural torque delivery paths between said driving shaft and said driven shaft, a pair of power input gear elements, a forward-drive fluid pressure operated friction clutch between said driving shaft and a first one of said power input gear elements to define in part a forward power flow path through said gearing, a fluid pressure operated reverse clutch between said driving shaft and a second power input element of said gearing, a fluid pressure source, a conduit structure interconnecting said pressure source and each of said clutches including separate branch portions extending to each clutch, a manual control valve means situated in and partly defining said conduit structure for selectively distributing pressure from said pressure source to each of said branch portions while exhausting the other branch portion, a hydromechanical interlock having at least one pressure-operated interlock plunger, an interlock element movable transversely with respect to the path of movement of said control valve means, said interlock element inhibiting motion of said control valve means when it assumes one position and movable out of registry with said control valve means when it assumes another position, a mechanical connection between said plunger and said interlock element for operating the latter, a source of pressure signal that is proportional in magnitude to the driving speed of said driving member, and a hydraulic connection between said signal source and said plunger for actuating the latter to a position wherein motion of said control valve means is inhibited when the pressure signal exceeds a predetermined value, said pressure source comprising an engine driven pump and a main regulator valve means located on the discharge side of said pump for regulating the output pressure of said pump to a predetermined value, said pressure signal source and said regulator valve means having common portions.

5. The combination as set forth in claim 1 wherein said hydromechanical interlock includes two plungers and two motion inhibiting interlock elements, each plunger being mechanically connected to a separate one of said interlock elements, each interlock element being movable into the path of motion of said manual control valve means when said speed signal exceeds said predetermined value, said speed signal acting upon and triggering the operation of each plunger, one plunger inhibiting motion of said manual control valve means in one direction to the reverse drive position and the other element inhibiting the motion of said manual control means in the opposite direction to the forward drive position, said pressure source comprising an engine driven pump and a main regulator valve means located on the discharge side of said pump for regulating the output pressure of said pump to a predetermined value, said pressure signal source and said regulator valve having common portions.

6. The combination as set forth in claim 2 wherein said hydromechanical interlock includes two plungers and two motion inhibiting interlock elements, each plunger being mechanically connected to a separate one of said interlock elements, each interlock element being movable into the path of motion of said manual control valve means when said speed signal exceeds said predetermined value, said speed signal acting upon and triggering the operation of each plunger, one plunger inhibiting motion of said manual control valve means in one direction to the reverse drive position and the other element inhibiting the motion of said manual control means in the opposite direction to the forward drive position, said pressure source comprising an engine driven pump and a main regulator valve means located on the discharge side of said pump for regulating the output pressure of said pump to a predetermined value, said pressure signal source and said regulator valve having common portions.

7. The combination as set forth in claim 4 wherein said regulator valve means comprises a regulating valve land and registering internal valve land adapted to establish controlled communication between the discharge side of said pump and the sump region, and a flow restricting orifice means defined in part by said lands for establishing a variable orificing action between said pump and said sump region as the speed of said pump exceeds the preselected engine speed whereby a pressure build-up occurs in the discharge side of said pump that is generally proportional to engine speed, and means for delivering said pressure build-up to said plungers for actuating the latter.

8. The combination as set forth in claim 5 wherein said regulator valve means comprises a regulating valve land and registering internal valve land adapted to establish controlled communication between the discharge side of said pump and the sump region, and a flow restricting orifice means defined in part by said lands for establishing a variable orificing action between said pump and said sump region as the speed of said pump exceeds the preselected engine speed whereby a pressure build-up occurs in the discharge side of said pump that is generally proportional to engine speed, and means for delivering said pressure build-up to said plungers for actuating the latter.

9. The combination as set forth in claim 6 wherein said regulator valve means comprises a regulating valve land and registering internal valve land adapted to establish controlled communication between the discharge side of said pump and the sump region, and a flow restricting orifice means defined in part by said lands for establishing a variable orificing action between said pump and said sump region as the speed of said pump exceeds the preselected engine speed whereby a pressure build-up occurs in the discharge side of said pump that is generally proportional to engine speed, and means for delivering said pressure build-up to said plungers for actuating the latter.

References Cited

UNITED STATES PATENTS

| | | | |
|---|---|---|---|
| 2,749,772 | 6/1956 | O'Malley | 74—665 |
| 3,060,230 | 9/1961 | Froslie | 74—869 |
| 3,250,142 | 5/1966 | Schuster et al. | 74—336.5 |
| 3,321,991 | 5/1967 | Kammer | 74—878 |

FRED C. MATTERN, Jr., *Primary Examiner.*

H. S. LAYTON, *Assistant Examiner.*